(12) United States Patent
Chung

(10) Patent No.: US 9,326,361 B2
(45) Date of Patent: Apr. 26, 2016

(54) LIGHTING APPARATUS

(71) Applicant: LG INNOTEK CO., LTD., Seoul (KR)

(72) Inventor: Won Suk Chung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/753,749

(22) Filed: Jun. 29, 2015

(65) Prior Publication Data

US 2015/0305124 A1    Oct. 22, 2015

Related U.S. Application Data

(63) Continuation of application No. 13/948,875, filed on Jul. 23, 2013, now Pat. No. 9,215,786.

(30) Foreign Application Priority Data

Jul. 23, 2012    (KR) .................. 10-2012-0079877

(51) Int. Cl.
| | |
|---|---|
| H05B 37/02 | (2006.01) |
| F21V 29/77 | (2015.01) |
| F21V 29/00 | (2015.01) |
| F21V 23/04 | (2006.01) |
| H05B 33/08 | (2006.01) |
| F21Y 101/02 | (2006.01) |

(52) U.S. Cl.
CPC ........ *H05B 37/0272* (2013.01); *F21V 23/0435* (2013.01); *F21V 29/004* (2013.01); *F21V 29/773* (2015.01); *F21V 29/777* (2015.01); *H05B 33/0803* (2013.01); *H05B 33/0806* (2013.01); *H05B 33/0842* (2013.01); *F21Y 2101/02* (2013.01); *Y02B 20/383* (2013.01)

(58) Field of Classification Search
USPC .................... 315/34, 39, 113, 112
See application file for complete search history.

(56) References Cited

U.S. PATENT DOCUMENTS

| | | | |
|---|---|---|---|
| 6,295,031 B1 | 9/2001 | Wallace et al. | |
| 7,521,872 B2 | 4/2009 | Bruning | |
| 8,633,646 B2 | 1/2014 | Molezion | |
| 9,184,497 B2 | 11/2015 | Chen et al. | |

(Continued)

FOREIGN PATENT DOCUMENTS

| | | |
|---|---|---|
| CN | 201661913 U | 12/2010 |
| JP | 10-190511 | 7/1998 |

(Continued)

OTHER PUBLICATIONS

European Search Report dated Jun. 18, 2015 in European Application No. 13823396.0.

(Continued)

*Primary Examiner* — Douglas W Owens
*Assistant Examiner* — Jonathan Cooper
(74) *Attorney, Agent, or Firm* — Saliwanchik, Lloyd & Eisenschenk

(57) ABSTRACT

Disclosed is a lighting apparatus. The lighting apparatus includes: a control module supplying power; a heat sink receiving the control module; a light source mounted on the heat sink and connected to the control module; and a communication module including a connection terminal inserted into the heat sink and connected to the control module, and an antenna device protruding from the heat sink. Since the lighting apparatus can be controlled in a wireless scheme, a user of the lighting apparatus can easily control the lighting apparatus.

16 Claims, 4 Drawing Sheets

(56) References Cited

U.S. PATENT DOCUMENTS

| | | | |
|---|---|---|---|
| 2007/0007898 A1 | 1/2007 | Bruning | |
| 2007/0014549 A1 | 1/2007 | Demarest et al. | |
| 2007/0252528 A1 | 11/2007 | Vermuelen et al. | |
| 2008/0272714 A1 | 11/2008 | Noble et al. | |
| 2010/0327766 A1 | 12/2010 | Recker et al. | |
| 2011/0063849 A1 | 3/2011 | Alexander et al. | |
| 2012/0069545 A1 | 3/2012 | Choi et al. | |
| 2012/0274208 A1* | 11/2012 | Chen et al. | 315/34 |
| 2013/0249392 A1 | 9/2013 | Kim | |
| 2013/0285544 A1* | 10/2013 | Molezion | 315/34 |
| 2015/0103515 A1 | 4/2015 | Bosua et al. | |

FOREIGN PATENT DOCUMENTS

| | | |
|---|---|---|
| JP | 2007-505448 A | 3/2007 |
| JP | 2008-028734 A | 2/2008 |
| JP | 2011-228130 A | 11/2011 |
| JP | 2012-079498 A | 4/2012 |
| JP | 4944282 B1 | 5/2012 |
| JP | 2012-227021 A | 11/2012 |
| JP | 2013-140751 A | 7/2013 |
| KR | 10-2004-0080398 A | 9/2004 |
| KR | 10-0884944 B1 | 2/2009 |
| KR | 10-0945459 B1 | 3/2010 |
| KR | 10-1009505 B1 | 1/2011 |
| WO | WO-2010/140136 A1 | 12/2010 |

OTHER PUBLICATIONS

European Search Report dated Sep. 23, 2013 in European Application No. 13177439.0.
Office Action dated May 27, 2014 in Japanese Application No. 2013-152572.
Notice of Allowance dated Jan. 20, 2014 in Korean Application No. 10-2012-0079877.
International Search Report in International Application No. PCT/KR2013/006453, filed Jul. 18, 2013.
Office Action dated Dec. 10, 2015 in U.S. Appl. No. 14/416,802.
European Search Report dated Feb. 15, 2016 in European Application No. 15195117.5.

* cited by examiner

US 9,326,361 B2

LIGHTING APPARATUS

CROSS-REFERENCE TO RELATED APPLICATIONS

This application is a continuation of U.S. application Ser. No. 13/948,875, filed Jul. 23, 2013, which claims the benefit under 35 U.S.C. §119 of Korean Patent Application No 10-2012-0079877, filed Jul. 23, 2012, which is hereby incorporated by reference in its entirety.

BACKGROUND

The embodiment relates to a lighting apparatus.

In general, various types of lighting apparatuses such as ceiling-mounting type lamps, scenery lighting lamps, sleeping lamps, and stand lamps exist according to purposes thereof. The lighting apparatuses must irradiate light with sufficient luminance level according to purposes. Accordingly, recently, a light emitting diode (LED) has been used for a lighting apparatus. In comparison with other light sources such as a fluorescent lamp and an incandescent lamp, the LED is advantageous because of low power consumption, a long lifetime, a fast response time, safety, and environment-friendliness. Accordingly, many studies and researches to replace the existing light sources with the light emitting diode have been carried out.

However, the above lighting apparatuses are tuned-on/off by a switch connected to the lighting apparatuses through a cable. Accordingly, a user of the lighting apparatus must inconveniently control the lighting apparatus.

BRIEF SUMMARY

An embodiment provides a lighting apparatus which can be easily controlled.

According to the embodiment, there is provided a lighting apparatus including: a control module supplying power; a heat sink receiving the control module; a light source mounted on the heat sink, and connected to the control module; and a communication module including a connection terminal inserted into the heat sink and connected to the control module, and an antenna device protruding from the heat sink.

According to another embodiment, there is provided lighting apparatus including: a control module supplying power; a heat sink receiving the control module; a light source mounted on the heat sink to emit light according to the power; and a communication module receiving a signal for controlling the control module, wherein the communication module includes: a substrate; a connection terminal disposed on the substrate, inserted into the heat sink, and connected to the control module; and an antenna device disposed on the substrate and protruding from the heat sink to be spaced apart from the heat sink.

The lighting apparatus according to the embodiment has a wireless communication function. In this case, the lighting apparatus may receive a wireless control signal through the communication module. Further, the lighting apparatus may control the light source according to the wireless control signal. Accordingly, the lighting apparatus can be controlled in a wireless scheme. That is, a user of the lighting apparatus can easily control the lighting apparatus. Accordingly, the convenience for a user of the lighting apparatus can be improved.

DETAILED DESCRIPTION

Figure 1:
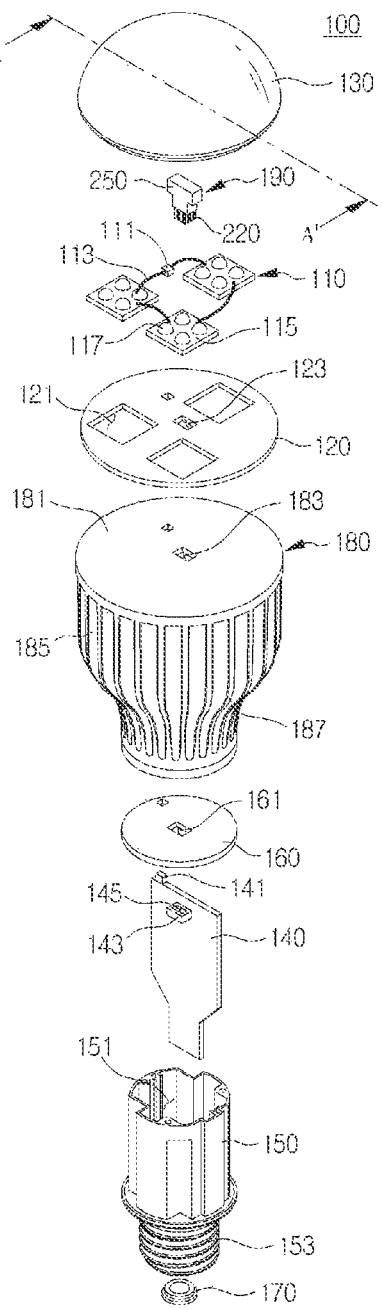
FIG. 1 is an exploded perspective view illustrating a lighting apparatus according to the embodiment.

Hereinafter, the embodiments will be described in detail with reference to accompanying drawings. In the accompanying drawings, the same components will be assigned with the same reference numerals. In a description of the embodiment, if the function or the structure related to the disclosure and generally known to those skilled in the art make the subject matter of the disclosure unclear, the details of the function or the structure will be omitted.

In the description of the embodiments, it will be understood that, when each element is referred to as being "on" or "under" another element, it can be "directly" or "indirectly" on or under another element or the other constituent elements may also be present. Such a position of the elements has been described with reference to the drawings.

Figure 2:
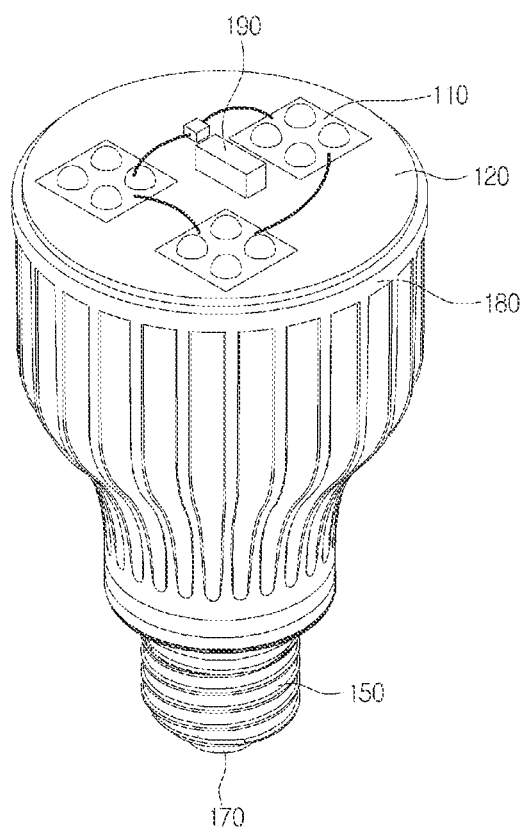
FIG. 2 is a perspective view illustrating a coupling structure of the lighting apparatus according to the embodiment.
Figure 3:
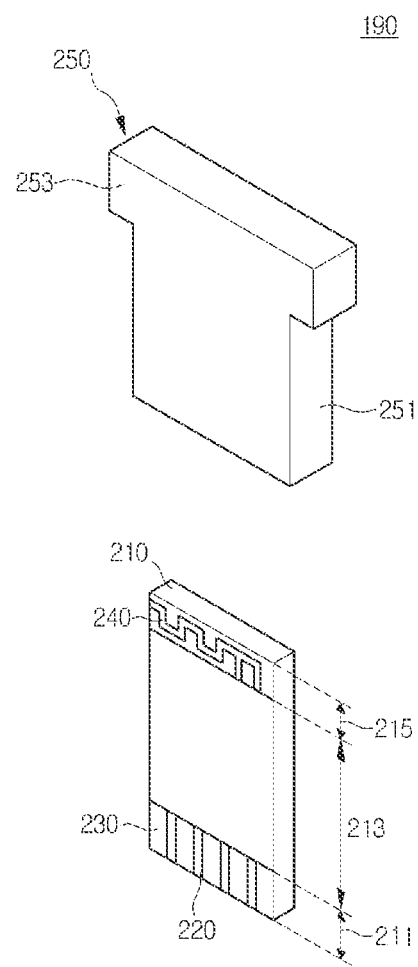
FIG. 3 is an exploded perspective view illustrating a communication module shown in FIG. 1.
Figure 4:
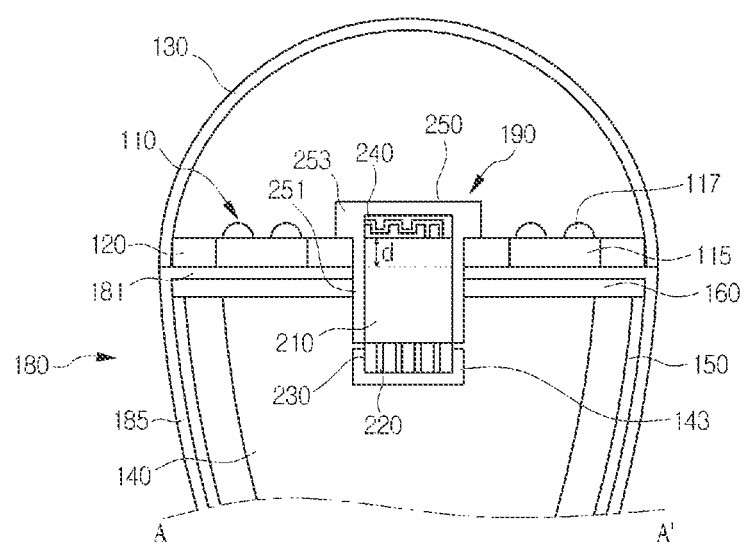
FIG. 4 is a sectional view taken along line of FIG. 1.

FIG. 1 is an exploded perspective view illustrating a lighting apparatus according to the embodiment, FIG. 2 is a perspective view illustrating a coupling structure of the lighting apparatus according to the embodiment, FIG. 3 is an exploded perspective view illustrating a communication module shown in FIG. 1, and FIG. 4 is a sectional view taken along line A-A' of FIG. 1.

Referring to FIGS. 1 to 4, the lighting apparatus 100 according to the embodiment includes a light source 110, a light source coupling part 120, a light distribution cover 130, a control module 140, a housing 150, a shield cover 160, a feeding cover 170, a heat sink 180, and a communication module 190.

The light source 110 generates light. In this case, the light source 110 may include an LED. The light source 110 includes a feeding device 111, a plurality of feeding wires 113, a plurality of base substrates 115, and a plurality of LEDs 117.

The feeding device 111 supplies power to the light source 110. The feeding device 111 may include a printed circuit board (PCB).

The feeding wires 113 connect the feeding device 111 to the base substrates 115. In this case, the feeding wires 113 may directly connect the feeding device 111 to the base substrates 115, respectively. The feeding wires 113 may connect the feeding device 111 to some of the base substrates 115, and may connect the base substrates 115 to each other. Further, the feeding wires 113 transfer the power from the feeding device 111 to the base substrates 115.

The base substrates 115 control driving of the light source 110. In this case, the base substrates 115 apply the power from the feeding device 111 to the LEDs. The base substrates 115 may include a PCB.

The LEDs 117 are mounted on the base substrates 115. In this case, the LEDs 117 may be mounted on each of the base substrates 115. Further, the LEDs 117 emit the light according to the power from the base substrates 115. That is, the LEDs 117 output the light.

The light source coupling unit 120 is coupled with the light source 110 to fix the light source 110. In this case, at least one first coupling hole 121 and at least one second coupling hole 123 are formed in the light source coupling unit 120. The first coupling holes 121 receive the base substrates 115, respectively. The light source coupling part 120 fixes the base substrates 115 and the LEDs 117 at positions of the first coupling holes 121, respectively. Further, the light coupling part 120 exposes the LEDs 117 through the first coupling holes 121, respectively. In addition, the second coupling hole 123 receives the feeding device 111 and the communication module 190. Moreover, the light source coupling part 120 exposes the feeding device 111 and the communication module 190 through the second coupling hole 123. The communication module 190 extends through the second coupling hole 123. That is, the communication module 190 protrudes in both directions about the light source coupling part 120 through the second coupling hole 123. The light source coupling part 120 may include an insulator.

The light distribution cover 130 surrounds the light source 110 from the top of the light source coupling part 120. The light distribution cover 130 may have an open bulb shape. Further, the light distribution cover 130 protects the light source 110, and discharges the light emitted from the light source 110. In this case, the light distribution cover 130 distributes the light to a front surface or a rear surface of the lighting apparatus. The light distribution cover 130 may include at least one of glass, plastic, polypropylene (PP), and polyethylene (PE). The light distribution cover 130 may include polycarbonate (PC) having good lightfast, heat resistant and impact characteristics. The light distribution cover 130 may include an inner surface on which pigment is coated facing the light source 110. The pigment may include a diffusing agent to diffuse the light.

The control module 140 controls an overall operation of the lighting apparatus 100. In this case, although not shown, the control module 140 may include a main substrate and a plurality of components. The main substrate may include a PCB. The components are mounted on the main substrate and are electrically connected to the main substrate. The components include a converter and a driver. The converter is connected to an external power source through the main substrate. Further, the converter converts AC power of the external power source into DC power. The driver controls driving of the light source 110.

In addition, the control module 140 supplies power to the light source 110. The control module may include a power supply unit (PSU). In this case, the control module 140 may control the light source 110 according to a received wireless control signal. The control module 140 includes a feeding terminal 141 and a coupling terminal 143.

The feeding terminal 141 is connected to the light source 110. The feeding terminal 141 makes contact with the feeding device 111 of the light source 110. In this case, the feeding terminal 141 protrudes from the control module 140. The feeding terminal 141 is coupled with the main substrate, and protrudes from the main substrate. Further, the feeding terminal 141 faces the feeding device 111.

In addition, the feeding terminal 141 supplies power to the light source 110. That is, the control module 140 supplies the power to the light source 110 through the feeding device 111. Further, the feeding terminal 141 transmits a light source control signal for controlling the light source 110 to the light source 110. That is, the control module 140 transfers the light source control signal to the light source 110 through the feeding device 111.

The coupling terminal 143 is connected to the communication module 190. The coupling terminal 143 is coupled with the communication module 190. In this case, the coupling terminal 143 may protrude from the control module 140. The coupling terminal 143 is coupled with the main substrate and protrudes from the main substrate. Further, the coupling terminal 143 may receive the communication module 190. A coupling groove 145 may be formed in the coupling terminal 143. The coupling groove 145 may face the communication module 190. Moreover, the coupling groove 145 may receive the communication module 190.

In addition, the coupling terminal 143 supplies the power to the communication module 190. That is, the control module 140 supplies the power to the communication module 190 through the coupling terminal 143. Further, the coupling terminal 143 receives a wireless control signal for controlling the control module 140 from the communication module 190. That is, the control module 140 receives the wireless control signal from the communication module 190 through the coupling terminal 143.

The housing 150 receives the control module 140. A receiving hole 151 is formed in the housing 150. That is, the housing 150 receives the control module 140 through the receiving hole 151. In this case, the housing 150 may have a cylindrical shape. Further, the housing 150 may prevent an electrical short between the control module 140 and the heat sink 180. The housing 150 may include a material having superior insulation and durability. Further, the housing 150 may include a resin material.

In addition, the housing 150 includes a connection terminal 153. In this case, the housing 150 is locked with the external power source through the connection terminal 153. The connection terminal 153 may be locked with the external power source through a socket scheme. Further, the connection terminal 153 may be connected to the external power source. That is, the connection terminal 153 may be electrically connected to the external power source. Further, the connection terminal 153 may electrically connect the control module 140 to the external power source. The connection terminal 153 may include a conductive material.

The shield cover 160 seals the housing 150. The shield cover 160 covers the receiving hole 151 of the housing 150 from the top of the housing 150. In this case, the shield cover 160 may prevent an electrical short between the control module 140 and the heat sink 180. The shield cover 160 may include a material having superior insulation and durability. Further, the shield cover 160 may include a resin material.

At least one through hole 161 is formed in the shield cover 160. The through hole 161 is aligned on the same axis with the second coupling hole 123. Further, the through hole 161 receives the feeding terminal 141 and the communication module 190. In this case, the feeding terminal 141 and the communication module 190 extend through the through hole 161. The shield cover 160 exposes the feeding terminal 141 and the coupling terminal 143 through the through hole 161. That is, the through hole 161 protrudes the feeding terminal 141 toward the feeding device 111. Further, the through hole 161 protrudes the communication module 190 toward the coupling terminal 143.

The feeding cover 170 seals the housing 150. The feeding cover 170 covers a receiving hole of the housing 150 from the bottom of the housing 150. Further, the feeding cover 170 makes contact with the external power source. In this case, the feeding cover 170 electrically connects the control module 140 to the external power source. The feeding cover 170 may include a conductive material.

The heat sink 180 receives the control module 140, the housing 150, and the shield cover 160. A receiving groove (not shown) is formed in the heat sink 180. That is, the heat sink 180 receives the control module 140, the housing 150, and the shield cover 160 through the receiving groove. Further, the light source 110 is mounted on the heat sink 180. In addition, the heat sink 180 releases heat generated from the light source 110, and protects the control module 140 from the heat generated from the light source 110. In this case, the heat sink 180 includes a first heat sink 181 and a second heat sink 185.

The first heat sink 181 is disposed above the shield cover 160. The first heat sink 181 is coupled with the light distribution cover 130. In this case, an outer peripheral portion of the first heat sink 181 is coupled with the light distribution cover 130. Further, the light source 110 and the light source coupling part 120 are mounted above the first heat sink 181. The first heat sink 181 makes contact with the light source 110. In this case, the first heat sink 181 moves the heat generated from the light source 110 to the second heat sink 185. The first heat sink 181 may have a circular shape or a plane shape.

At least one insertion hole 183 is formed in the first heat sink 181. The insertion hole 183 is aligned on the same axis with the second coupling hole 123 and the through hole 161. Further, the insertion hole 183 receives the feeding terminal 141 and the communication module 190. In this case, the feeding terminal 141 and the communication module 190 extend through the insertion hole 183. The first heat sink 181 exposes the feeding terminal 141 and the coupling terminal 143 through the insertion hole 183. That is, the insertion hole 183 protrudes the feeding terminal 141 toward the feeding device 111. Further, the insertion hole 183 protrudes the communication module 190 toward the coupling terminal 143.

The second heat sink 185 surrounds the housing 150. In this case, the second heat sink 185 exposes the connection terminal 153. That is, the second heat sink 185 surrounds the housing 150 except for a region of the connection terminal 153. The second heat sink 185 may have a cylindrical shape. The second heat sink 185 extends downward from the first heat sink 181. In this case, the second heat sink 185 releases the heat generated from the light source 110. A diameter of the second heat sink 185 may be gradually reduced downward along a central axis of the first heat sink 181.

Further, the second heat sink 185 includes a plurality of heat sink fins. In this case, the second heat sink 185 includes the heat sink fins 186 so that a surface area is increased. The heat sink fins 187 extend downward from the first heat sink 181. In this case, the heat sink fins 187 may be radially aligned about the central axis of the first heat sink 181. The heat sink fins 187 may protrude perpendicular to the central axis of the first heat sink 181.

The communication module 190 receives a wireless control signal for controlling the lighting apparatus 100. In this case, the communication module 190 is connected to the control module 140. The communication module 190 is spaced apart from the light source 110 across the light source coupling part 120, the heat sink 180, and the shield cover 160. In addition, the communication module 190 is coupled with the control module 140. The communication module 190 includes a substrate 210, a connection terminal 220, a ground part 230, an antenna device 240, and a protective cover 250.

The substrate 210 is provided in the communication module 190 for the purpose of support. In this case, the substrate 210 has a flat plate structure. The substrate 210 may include a PCB. Further, the substrate 210 may include a dielectric substance. The substrate 210 includes a connection region 211, a driving region 213, and an antenna region 215.

The connection region 211 is placed at one end of the substrate 210. The connection region 211 is opposed to the control module 140. In this case, the connection region 211 is opposed to the coupling terminal 143. The connection region 211 may be opposed to the coupling groove 145. In addition, the connection region 211 is inserted into the heat sink 180. In this case, the connection region is received in a receiving groove of the heat sink 180. Further, the connection region 211 is coupled with the control module 140. In this case, the connection region 211 is locked with the coupling terminal 143. The connection region 211 may be inserted into the coupling groove 145.

The driving region 213 extends from the connection region 211. In this case, the driving region 213 is placed at a center of the substrate 210. The driving region 213 extends across the light source coupling part 120, the heat sink 180, and the shield cover 160. The driving region 213 is inserted into the heat sink 180. In this case, the driving region 213 is received in the second coupling hole 123, the insertion hole 183, the through hole 161, and a receiving groove of the heat sink 180 which are aligned on the same axis.

Further, the driving region 213 includes a driving device (not shown). In this case, the driving device is embedded in the substrate 210, and is disposed in the driving region 213. The driving device extends from the driving region 213. In addition, one end of the driving device extends to the connection region 211, and another end of the driving device extends to the antenna region 215.

The antenna region 215 is placed at the other end of the substrate 210. The antenna region 215 is placed in opposition to the connection region 211 about the driving region 213. Further, the antenna region 215 is connected to the connection region 211 through the driving region 213. The antenna region 215 protrudes from the heat sink 180. The antenna region 215 is exposed from the heat sink 180. In this case, the antenna region 215 is placed above the light coupling part 120. The antenna region 215 may be spaced apart from the light source 110.

The connection terminal 220 serves as an interface for the control module 140 in the communication module 190. The connection terminal 200 is disposed at the connection region 211 of the substrate 210. In this case, the connection terminal 220 is connected to one end of the driving device. Further, the connection terminal 220 is connected to the control module 140. In this case, the connection terminal 220 is coupled with the coupling terminal 143 together with the connection region 211 and is connected to the coupling terminal 143. The connection terminal 220 may be inserted into a coupling groove 145. Power is supplied to the communication module 190 through the connection terminal 220. That is, the power is supplied from the coupling terminal 143 to the connection terminal 220.

The ground part 230 is provided in the communication module 190 for the purpose of grounding. The ground part 230 is disposed at the connection region 211 of the substrate 210. In this case, the ground part 230 may be spaced apart from the connection terminal 220. That is, the ground part 230 may not make contact with the connection terminal 220. Moreover, the ground part 230 may be connected to one end of the driving device.

The antenna device 240 of the communication module 190 performs a wireless communication function. In this case, the antenna device 240 resonates at a preset frequency band to transmit/receive an electromagnetic wave. The antenna device 240 resonates at preset impedance. In this case, the antenna device 240 is disposed at the antenna region 215 of the substrate 210. In this case, the antenna device 240 is connected to another end of the driving device. That is, the antenna device 240 is connected to the connection terminal 220 through the driving device. The antenna device 240 may be connected to the ground part 230 through the driving device. One end of the antenna device 240 is connected to the driving device and another end of the antenna device 240 is open.

In addition, the antenna device 240 protrudes from the heat sink 180. The antenna device 240 is disposed outside the heat sink 180. That is, the antenna device 240 is exposed from the heat sink 180 together with the antenna region 215. Further, the antenna device 240 is spaced apart from the heat sink 180. A spacing distance d between the antenna device 240 and the heat sink 180 may be approximately 1 mm or more. In this case, the antenna device 240 is placed above the light source coupling part 120. The antenna device 240 may be spaced apart from the tight source 110.

Further, the antenna device 240 is driven using power supplied from the connection terminal 220. In this case, the antenna device 240 receives a wireless control signal for controlling the control module 140. In addition, the antenna device 240 transmits the wireless control signal to the control module 140. In this case, the antenna device 240 transmits the wireless control signal to the control module 140 through the connection terminal 220.

In this case, an antenna device 240 may be formed in a patch type and then be attached to the antenna region 215. The antenna device 240 may be drawn with a conductive ink so as to be disposed at the antenna region 215. The antenna device 240 may be patterned at the antenna region 215. The antenna device 240 may include at least one of a bar type antenna element, a meander type antenna element, a spiral type antenna element, a step type antenna element, and a loop type antenna element. In this case, the antenna device 240 may include a conductive material. The antenna device 240 may include at least one of silver (Ag), palladium (Pd), platinum (Pt), copper (Cu), gold (Au), and nickel (Ni).

The protective cover 250 receives the substrate 210. In this case, the protective cover 250 covers the substrate 210. The protective cover 250 covers the driving region 213 and the antenna region 215, and exposes the connection region 211. The protective cover 250 receives the antenna device 240, and exposes the connection terminal 220. That is, the connection terminal 220 protrudes from the protective cover 250. The protective cover 250 may include at least one of plastic, polypropylene (PP), polyethylene (PE), and polycarbonate (PC). The protective cover 250 includes a first protective cover 251 and a second protective cover 253.

The first protective cover 251 surrounds the driving region 213. The first protective cover 251, together with the driving region 213, extends across the light source coupling part 120, the heat sink 180, and the shield cover 160. The protective cover 251 is inserted into the heat sink 180. In this case, the first protective cover 251 is received in the second coupling hole 123, the insertion hole 183, the through hole 161, and a receiving groove of the heat sink 180 which are aligned on the same axis.

The second protective cover 253 receives the antenna region 215. Further, the second protective cover 253 receives the antenna device 240. The second protective cover 253 extends from the first protective cover 251. In this case, an insertion groove is formed in the second protective cover 253. That is, the second protective cover 253 receives the antenna device 240 together with the antenna region 215 through the insertion groove.

In addition, the second protective cover 253 protrudes from the heat sink 180. The second protective cover 253 is exposed from the heat sink 180. In this case, the antenna device 240 is spaced apart from the heat sink 180 by the second protective cover 253. The second protective cover 253 is placed above the light source coupling part 120. In addition, the second protective cover 253 is locked with the heat sink 180. In this case, the second protective cover 253 has a size larger than a size of the insertion hole 183 so that the second protective cover 153 is not inserted into the heat sink 180.

According to the embodiment, the lighting apparatus 100 has a wireless communication function. In this case, the lighting apparatus 100 may receive a wireless control signal through the communication module 190. Further, the lighting apparatus 100 may control the light source 110 according to the wireless control signal. Accordingly, the lighting apparatus 100 can be controlled in a wireless scheme. That is, a user of the lighting apparatus 100 may easily control the lighting apparatus 100. Accordingly, the convenience for a user of the lighting apparatus 100 can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A lighting apparatus comprising:
   a control module supplying power;
   a heat sink receiving the control module;
   a light source mounted on the heat sink and connected to the control module; and
   a communication module including a substrate on which an antenna device is disposed,
   wherein a connection terminal is provided on the substrate,
   wherein an insertion hole is formed in the heat sink and the substrate extends by passing through the insertion hole such that the connection terminal is inserted into the heat sink and the antenna device protrudes from the heat sink, and
   wherein the control module comprises a coupling terminal to receive the connection terminal for connecting the communication module to the control module.

2. The lighting apparatus of claim 1, wherein the antenna device is spaced apart from the heat sink.

3. The lighting apparatus of claim 1, wherein the substrate comprises:
   a connection region on which the connection terminal is disposed; and
   an antenna region on which the antenna device is disposed.

4. The lighting apparatus of claim 3, wherein the communication module further comprises a driving device connecting the connection terminal to the antenna device and driving the antenna device.

5. The lighting apparatus of claim 1, wherein the communication module further comprises a protective cover covering the substrate to receive the antenna device, and exposing the connection terminal.

6. The lighting apparatus of claim 4, wherein the substrate further comprises a ground part disposed at the connection region and spaced apart from the connection terminal while making contact with the antenna device through the driving device.

7. The lighting apparatus of claim 4, wherein the substrate further comprises a driving region interposed between the connection region and the antenna region, the driving device being disposed on the driving region.

8. The lighting apparatus of claim 5, wherein the protective cover comprises:
   a first protective cover inserted into the heat sink; and
   a second protective cover coupled with the heat sink and protruding from the heat sink.

9. The lighting apparatus of claim 2, wherein a spacing distance between the heat sink and the antenna device is 1 mm or more.

10. The lighting apparatus of claim 1, wherein the control module further comprises a feeding terminal connected to the light source.

11. A lighting apparatus comprising:
a control module supplying power;
a heat sink receiving the control module;
a light source mounted on the heat sink to emit light according to the power; and
a communication module receiving a signal for controlling the control module,
wherein the communication module comprises:
a substrate;
a connection terminal disposed on the substrate, inserted into the heat sink, and connected to the control module; and
an antenna device disposed on the substrate and protruding from the heat sink to be spaced apart from the heat sink,
wherein an insertion hole is formed in the heat sink and the substrate extends by passing through the insertion hole such that the connection terminal is inserted into the heat sink and the antenna device protrudes from the heat sink, and
wherein the control module comprises a coupling terminal to receive the connection terminal for connecting the communication module to the control module.

12. The lighting apparatus of claim 11, wherein the communication module further comprises a driving device connecting the connection terminal to the antenna device and driving the antenna device.

13. The lighting apparatus of claim 12, wherein the communication module further comprises a ground part spaced apart from the connection terminal, and making contact with the antenna device through the driving device.

14. The lighting apparatus of claim 13, wherein the substrate comprises:
a connection region on which the connection terminal and the ground part are disposed;
an antenna region on which the antenna device is disposed;
a driving region on which the driving device is disposed between the connection region and the antenna region.

15. The lighting apparatus of claim 14, wherein the communication module comprises:
a first protective cover surrounding the driving region; and
a second protective cover coupled with the heat sink, and protruding from the heat sink.

16. The lighting apparatus of claim 11, wherein the control module further comprises:
a feeding terminal connected to the light source.

* * * * *